K. F. UNGERER & E. BECKER.
PROCESS FOR SOLDERING CORD CHAINS.
APPLICATION FILED SEPT. 29, 1908.
944,640.
Patented Dec. 28, 1909.
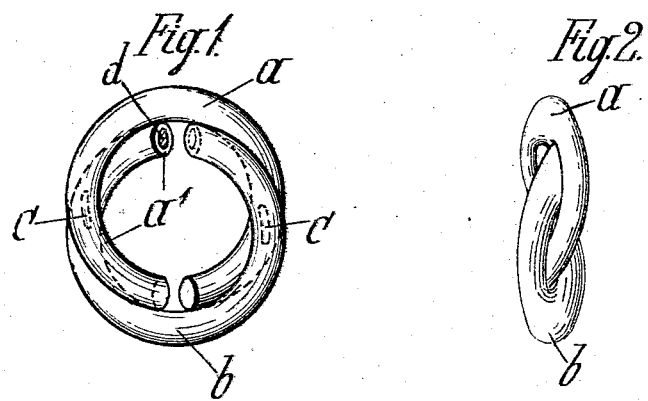
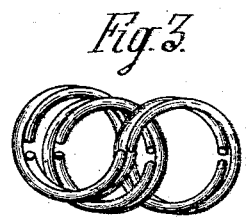
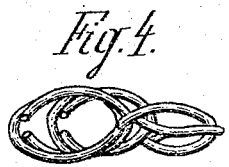
WITNESSES:
R. Zufall
C. W. Meyer.
INVENTORS:
Karl Friedrich Ungerer
Eric Becker

UNITED STATES PATENT OFFICE.

KARL FRIEDRICH UNGERER AND EMIL BECKER, OF PFORZHEIM, GERMANY.

PROCESS FOR SOLDERING CORD CHAINS.

944,640.      Specification of Letters Patent.      Patented Dec. 28, 1909.

Application filed September 29, 1908. Serial No. 455,328.

*To all whom it may concern:*

Be it known that we, KARL FRIEDRICH UNGERER and EMIL BECKER, subjects of the German Emperor, and residents of Pforzheim, Germany, have invented certain new and useful Improvements in Processes for Soldering Cord Chains, of which the following is a specification.

This invention relates to an improved process for soldering wire cord chains of the type which comprise a number of links consisting each of two adherent open wire rings which are hung into each other in such a way that the gaps of the same lie diametrically opposite to each other, while the rings are so entangled that the planes laid through the rings intersect the two halves of one ring, touching thus different sides of the two halves of the other ring. To hold the chain together, the two rings of each link must be soldered to each other. The soldering of the single links was hitherto made by hand, which is very cumbersome and particularly noxious for the eyes as the single chain links and also the solder particles are very small. To overcome these drawbacks by a mechanical soldering, the improved process is provided.

In the accompanying drawing, Figures 1 and 2 show in front and side view respectively two entangled links of a wire cord chain, while Figs. 3 and 4 are similar views to the former, of several chain link pairs hung into each other.

As shown in Fig. 1, plain wire is employed for one ring and soldering wire for the other ring of each link, the rings being so arranged that, when the chain is formed and suspended in vertical position, the gap of the ring of soldering wire lies at the top and that of the ring of plain wire at the bottom, for the purpose hereinafter explained. Before the rings $a$ and $b$ are hung into each other to form the chain, the outer shells $a^1$ of the rings $b$ consisting of soldering wire are opened in a mechanical way by means of a fraise, chisel or the like at those points $c$ where the two rings, which are diametrically entangled, touch each other. Upon the cord chain links thus prepared being all hung into each other in the particular way mentioned above, the chain thus formed is suspended in vertical position and heated up to the melting temperature of the solder core $d$ of the chain links whereby the molten solder of the soldering wire escapes through the openings $c$ made for this purpose in the links and thus effects the connection between each two rings, while it sinks at the same time at the open ends, which are disposed at the highest point of the ring, so that it is there prevented from running out.

Having fully described our invention, what we claim and desire to secure by Letters Patent is:—

A process for soldering wire cord chains of the type in which each link consists of two entangled open rings one of the same being made of plain and the other of soldering wire, consisting in, piercing the outer shell of the ring of soldering wire of each link at those points where it touches the adherent ring of plain wire, arranging the links in such a way that the gap of the ring of soldering wire lies at the top and the gap of the ring of plain wire at the bottom when the chain thus formed hangs in vertical position, suspending the chain in said vertical position, and heating the chain to the melting point of the solder, for the purpose set forth.

In testimony whereof we have hereunto set our hands in the presence of two subscribing witnesses.

KARL FRIEDRICH UNGERER.
    EMIL BECKER.

Witnesses:
    SYDNEY ELLIOTT,
    THEO. KUEHL.